United States Patent
Wu et al.

(10) Patent No.: US 11,848,971 B2
(45) Date of Patent: Dec. 19, 2023

(54) DATA SHARING METHOD AND DATA SHARING SYSTEM CAPABLE OF PROVIDING VARIOUS GROUP CALLING MODES

(71) Applicant: BENQ CORPORATION, Taipei (TW)

(72) Inventors: Chen-Chi Wu, Taipei (TW); Chin-Fu Chiang, Taipei (TW); Chia-Nan Shih, Taipei (TW); Lin-Yuan You, Taipei (TW); Jung-Kun Tseng, Taipei (TW); Chuang-Wei Wu, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/732,528

(22) Filed: Apr. 29, 2022

(65) Prior Publication Data

US 2022/0368738 A1   Nov. 17, 2022

(30) Foreign Application Priority Data

May 12, 2021 (CN) .......................... 202110519243.6

(51) Int. Cl.
*H04L 65/403* (2022.01)
*H04L 65/1069* (2022.01)
*H04N 5/262* (2006.01)
*H04N 5/775* (2006.01)

(52) U.S. Cl.
CPC ........ *H04L 65/403* (2013.01); *H04L 65/1069* (2013.01); *H04N 5/2624* (2013.01); *H04N 5/775* (2013.01)

(58) Field of Classification Search
CPC ... H04L 65/403; H04L 65/109; H04N 5/2624; H04N 5/775; H04N 65/403

USPC ....................................................... 348/14.02
See application file for complete search history.

(56) References Cited

U.S. PATENT DOCUMENTS

| 2005/0238156 | A1* | 10/2005 | Turner | H04L 51/043 709/204 |
| 2006/0123082 | A1* | 6/2006 | Digate | G06Q 10/107 709/205 |
| 2008/0091778 | A1* | 4/2008 | Ivashin | G06Q 10/10 709/224 |
| 2016/0127689 | A1* | 5/2016 | Huang | H04L 12/1813 348/14.08 |

FOREIGN PATENT DOCUMENTS

| CN | 109471844 A | 3/2019 |
| WO | 2005/062912 A2 | 7/2005 |
| WO | 2005/062912 A3 | 5/2007 |

* cited by examiner

*Primary Examiner* — Maria El-Zoobi

(57) ABSTRACT

A data sharing method includes logging in a first account through a communication interface by a first receiver for establishing a link between the first receiver and a server corresponding to the communication interface, logging in a second account through the communication interface by a second receiver for establishing a link between the second receiver and the server corresponding to the communication interface, and transmitting image data from a first transmitter to the second receiver through the first receiver and the server for sharing the image data. The first receiver is linked to a first display. The second receiver is linked to a second display. The image data is shared with the first display and the second display.

21 Claims, 7 Drawing Sheets

DATA SHARING METHOD AND DATA SHARING SYSTEM CAPABLE OF PROVIDING VARIOUS GROUP CALLING MODES

BACKGROUND OF THE INVENTION

1. Field of the Invention

The present invention relates to a data sharing method and a data sharing system, and more particularly, a data sharing method and a data sharing system capable of providing various group calling modes.

2. Description of the Prior Art

With rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operation efficiency.

When a traditional conference reporting system is used for sharing data remotely, a video conference function is required. Currently, the video conference function can be categorized into two modes: a multi-function host mode having video camera hardware and a software mode. In the multi-function host mode having video camera hardware, manufacturers provide a remote controller to a user for entering an account password. In this mode, the user can use the remote controller, a keyboard, or a mouse for operating a video machine directly. In the software mode, a computer can perform the video conference function by integrating videos provided by two different users through a pre-installed software program or a web platform provided by a third-party company. However, in the multi-function host mode or the software mode, the user must be familiar with the operations of the remote system or program for smoothly executing the video conference function. In other words, when the user uses the traditional conference reporting system for the first time, it takes a lot of time to get familiar with the operations. Thus, to develop an intuitive conference reporting system is an important issue.

SUMMARY OF THE INVENTION

In an embodiment of the present invention, a data sharing method is disclosed. The data sharing method comprises logging in a first account through a communication interface by a first receiver for establishing a link between the first receiver and a server corresponding to the communication interface, logging in a second account through the communication interface by a second receiver for establishing a link between the second receiver and the server corresponding to the communication interface, and transmitting image data from a first transmitter to the second receiver through the first receiver and the server for sharing the image data. The first receiver is linked to a first display. The second receiver is linked to a second display. The image data is shared with the first display and the second display.

In another embodiment of the present invention, a data sharing method is disclosed. The data sharing method comprises reading a first internet protocol address saved in a first receiver, reading a second internet protocol address saved in a second receiver, establishing a link between the first receiver and the second receiver according to the first internet protocol address and the second internet protocol address, and communicating the first receiver with the second receiver after the link between the first receiver and the second receiver is established.

In another embodiment of the present invention, a data sharing system is disclosed. The data sharing system comprises a plurality of receivers, a first transmitter, a second transmitter, and a server. The plurality of receivers comprises a first receiver and a second receiver. The first transmitter is linked to the first receiver. The second transmitter is linked to the second receiver. The server is linked to the plurality of receivers. The first receiver uses a communication interface for logging in a first account. The first receiver is linked to the server through the communication interface after the first account is logged in. The second receiver uses the communication interface for logging in a second account. The second receiver is linked to the server through the communication interface after the second account is logged in. The first transmitter transmits image data to the second receiver through the first receiver and the server for sharing the image data. The first receiver is linked to a first display. The second receiver is linked to a second display. The image data is shared with the first display and the second display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
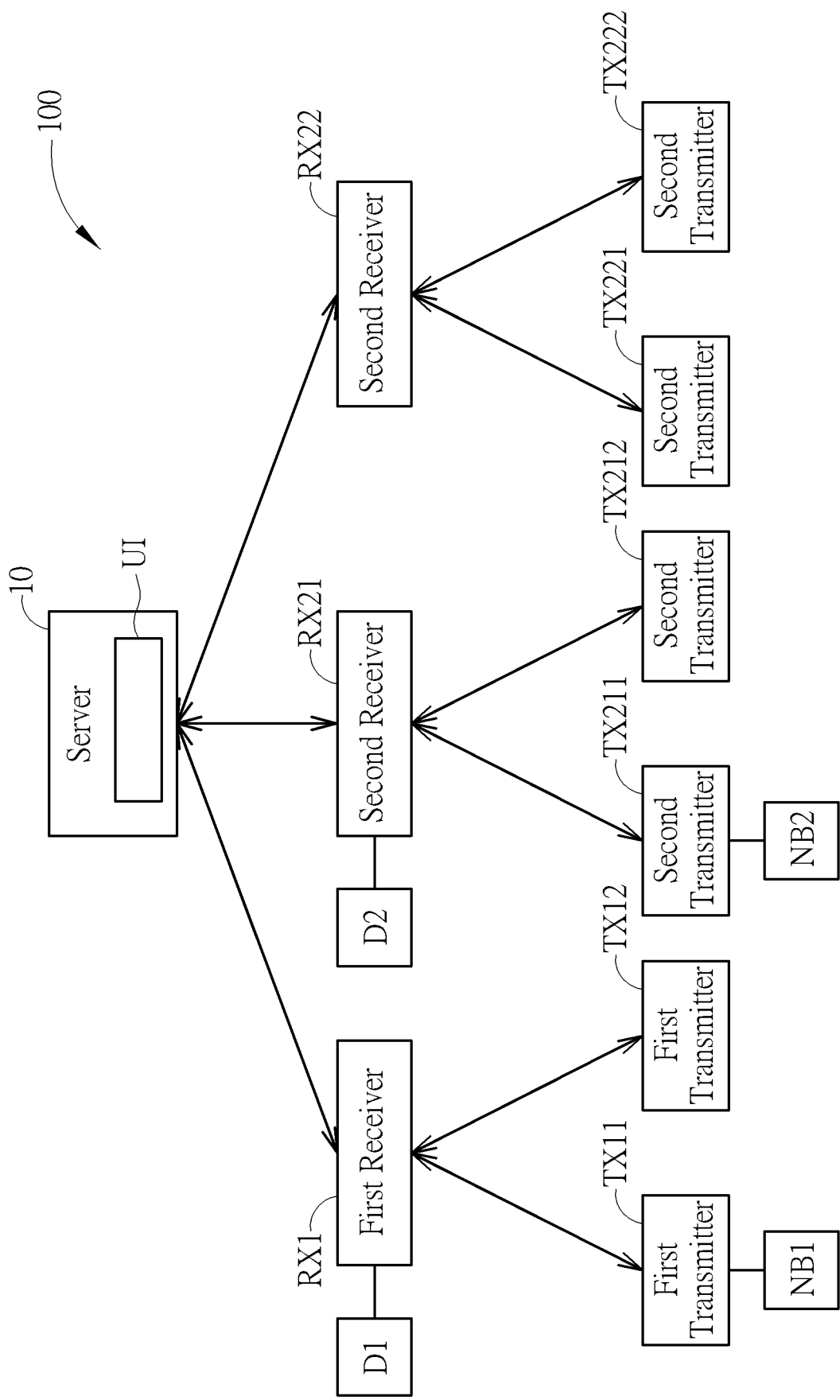
FIG. 1 is a block diagram of a data sharing system according to an embodiment of the present invention.

FIG. 1 is a block diagram of a data sharing system 100 according to an embodiment of the present invention. The data sharing system 100 can be used for sharing remote conference data or remote video data. The data sharing system 100 includes a plurality of receivers RX1, RX21, and RX22. To avoid ambiguity, the receiver RX1 is called as a first receiver RX1 hereafter. The receivers RX21 and RX22 are called as second receivers RX21 and RX22 hereafter. The data sharing system 100 further includes at least one first transmitter, such as first transmitters TX11 and TX12. The data sharing system 100 further includes at least one second transmitter, such as second transmitters TX211, TX212, TX221, and TX222. The first transmitters TX11 and TX12 are linked to the first receiver RX1. The second transmitters TX211 to TX212 are linked to the second receiver RX21. The second transmitters TX221 to TX222 are linked to the second receiver RX22. However, there is no limit to the number of transmitters linked to each receiver. A server 10 is linked to the plurality of receivers RX1, RX21, and RX22. A link between each receiver and a corresponding transmitter can be a wireless link. A link between each transmitter and the server 10 can also be a wireless link. The number of links between the receivers and the server 10 is not limited thereto. Each transmitter can be linked with a corresponding communication device. For example, the first communication device NB1 can be linked with the first transmitter TX11. The second communication device NB2 can be linked with the second transmitter TX211. Each receiver can be linked with a corresponding display. For example, the first receiver RX1 can be linked with the first display D1. The second receiver RX21 can be linked with the second display D2. Each receiver can perform data transmission with at least one transmitter by using a wireless link. For example, the first receiver RX1 can perform data transmission with the first transmitters TX11 and TX12 by using wireless links. Further, the first communication device NB1 and the second communication device NB2 can be computers, smartphones, or media data sources. The media signal (i.e., including video data and audio data) generated by the first communication device NB1 can be transmitted to the first receiver RX1 through the first transmitter TX11. Therefore, the first display D1 can display the media signal corresponding to the first communication device NB1. Further, in the data sharing system 100, after the server 10 is linked to the receiver, a calling group can be established. When the first receiver RX1 or at least one first transmitter (TX11 and/or TX12) is triggered, the first receiver RX1 can transmit a request signal to at least one second receiver (i.e., the second receiver RX22) in the calling group through the server 10. Alternatively, after at least one first transmitter (TX11 and/or TX12) is triggered, the first receiver RX1 can be notified to transmit a request signal through the server 10 to the second receiver RX22. After at least one second receiver (i.e., the second receiver RX22) in the calling group receives the request signal, a notification message can be generated. Then, according to the notification message, at least one second receiver (RX22) or at least one second transmitter (TX221 and TX222) in the calling group can be triggered for generating a connection acceptance signal. Then, the first receiver RX1 can establish a data link with at least one second receiver RX22 through the server 10. Further, after the data link between the first receiver TX11 and the at least one second receiver RX22 is established, the first transmitter TX11 can transmit image data through the first receiver RX1 and the server 10 to at least one second receiver RX22 for sharing the image data. Further, the data sharing system 100 can provide various intuitive operation modes. Therefore, the user can immediately execute a remote data sharing function. Here, different receivers can be disposed inside different conference rooms. For example, the first receiver RX1 can be disposed inside a conference room A. The second receiver RX21 can be disposed inside a conference room B. The second receiver RX22 can be disposed inside a conference room C. In the data sharing system 100, in practice, the server 10 can be a Google server or other online video sharing server. The first receiver RX1 has a preconfigured Google account. Therefore, for an online conference, the server 10 can link to a receiver after the at least one preconfigured Google account is logged in through a communication interface. The server 10 can receive the image data transmitted from at least one receiver. For example, the server can integrate the image data transmitted from at least one receiver for outputting the image data to the first display D1 through the first receiver RX1. Further, the first receiver RX1 can receive the image data from the second receiver RX21 through the server 10. The first receiver RX1 can integrate image data transmitted from the first transmitter TX1 and the image data transmitted from the second receiver RX21 for outputting the integrated image data to the first display D1. The first receiver RX1 can use at least one port for linking to a peripheral video capturing device. The peripheral video capturing device can capture video information in the conference room A where the first receiver RX1 is disposed. After a link between the first receiver RX1 and the second receiver RX21 is established, the second receiver RX21 can transmit data transmitted from the first receiver RX1 and the video information in the conference room A captured by the peripheral video capturing device to a designated receiver through the server 10. Further, the first receiver RX1 can use the communication interface UI for logging in a first account. The first receiver RX1 is linked to the server 10 through the communication interface UI after the first account is logged in. Similarly, the second receiver RX21 can use the communication interface UI for logging in a second account. The second receiver RX21 is linked to the server 10 through the communication interface UI after the second account is logged in. Here, the communication interface UI can be disposed on any reasonable hardware. For example, the communication interface UI can be disposed on the server 10, each receiver, or each transmitter. Any reasonable hardware modification falls into the scope of the present invention. Details of the various calling modes of the data sharing system 100 are described below.

Figure 2:
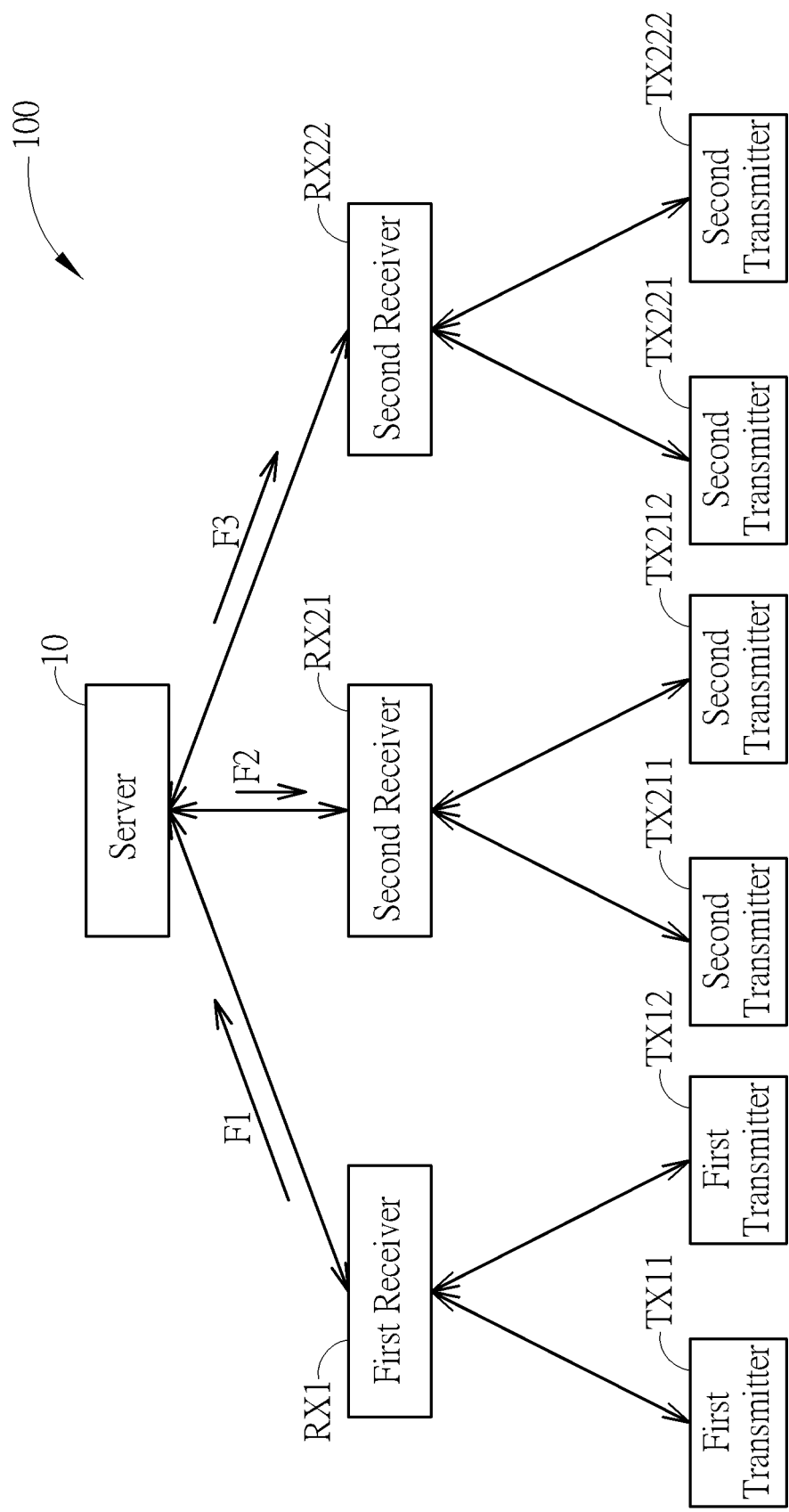
FIG. 2 is an illustration of data paths under a first calling mode of the data sharing system in FIG. 1.

FIG. 2 is an illustration of data paths under a first calling mode of the data sharing system 100. The first calling mode can be regarded as a global broadcast calling mode. Suppose the first receiver RX1 in the conference room A wants to share remote conference data with the second receiver RX22 in the conference room C. In this mode, the calling group includes all the receivers, such as the first receiver RX1, the second receiver RX21, and the second receiver RX22. The first receiver RX1 can transmit the request signal to other receivers of the calling group under the global broadcast calling mode through the server 10. For example, after the first receiver RX1 (or the first transmitter TX11 or TX12) is triggered, the request signal can be generated by the first receiver RX1 to the server 10 through the data path F1. The server 10 can relay the request signal to the second receiver RX21 through the data path F2. Further, the server 10 can relay the request signal to the second receiver RX22 through the data path F3. After the second receiver RX21 and the second receiver RX22 receive the request signal, the second receiver RX21, the second receiver RX22 and the corresponding second transmitters TX211, TX212, TX221, and TX222 can generate voice signals or emit light signals at the same time. Therefore, when the user in the conference room C operates the second transmitter TX221, TX222 or the second receiver RX22 (i.e., pressing the confirmation button), the first receiver RX1 can communicate with the second receiver RX22 through the server 10. However, the global broadcast calling mode may also trigger the second receiver RX21. Therefore, when the person in the conference room B confirms the request signal through the second receiver RX21, the person in the conference room B can also browse conference content data shared by the first receiver RX1 and the second receiver RX22 through the second receiver RX21.

Figure 3:
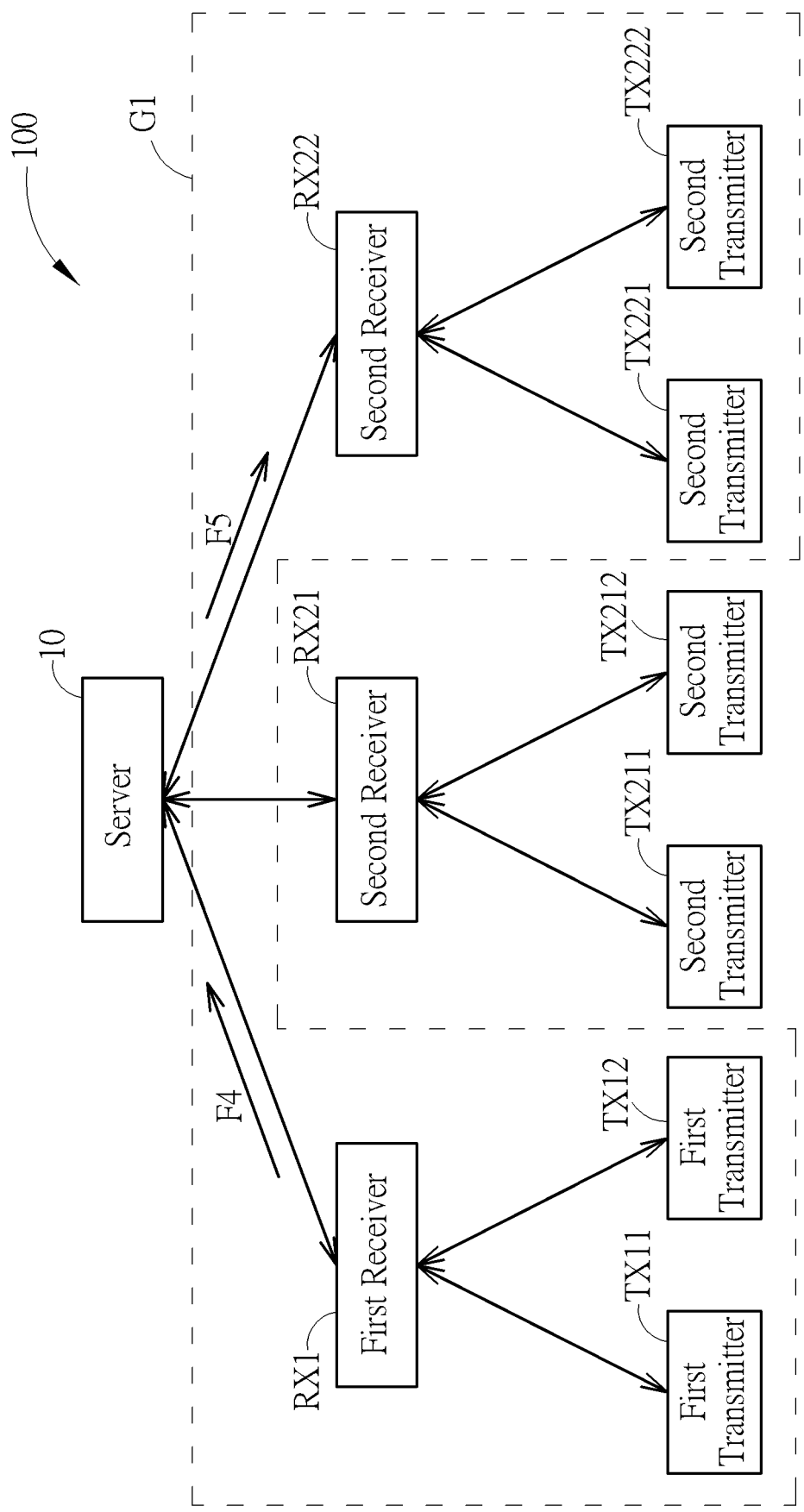
FIG. 3 is an illustration of data paths under a second calling mode of the data sharing system in FIG. 1.

FIG. 3 is an illustration of data paths under a second calling mode of the data sharing system 100. In the second calling mode, the calling group can be predetermined. For example, the second receiver RX22 can be selected by using a selection interface disposed on the server 10. The call group G1 can include the first receiver RX1 disposed inside the conference room A and the second receiver RX22 disposed inside the conference room C. In other words, the call group G1 can be formed by selecting the first receiver RX1 and the second receiver RX22 from all receivers. Here, after the first receiver RX1 (or the first transmitter TX11 or TX12) is triggered, the request signal can be generated by the first receiver RX1 to the server 10 through the data path F4. The server 10 can generate a notification message according to the calling group and then transmit the notification message to the second receiver RX22 or at least one designated second transmitter linked to the second receiver RX22 through the data path F5. After the second receiver RX22 receives the notification message, the second receiver RX22 and the corresponding second transmitters TX221 to TX222 can generate voice signals or emit light signals at the same time. In other embodiments, the second receiver RX22 can generate the notification message. Therefore, when the user in the conference room C operates the second transmitter TX221, TX222 or the second receiver RX22 (i.e., pressing the confirmation button), the connection acceptance signal can be generated according to the notification message. In other words, the second receiver RX22, the second transmitter TX221, or the second transmitter TX222 of the calling group can be triggered according to the notification message for generating the connection acceptance signal. Finally, data links among the first receiver RX1, the second receiver RX22, and the server 10 can be established according to the connection acceptance signal.

Figure 4:
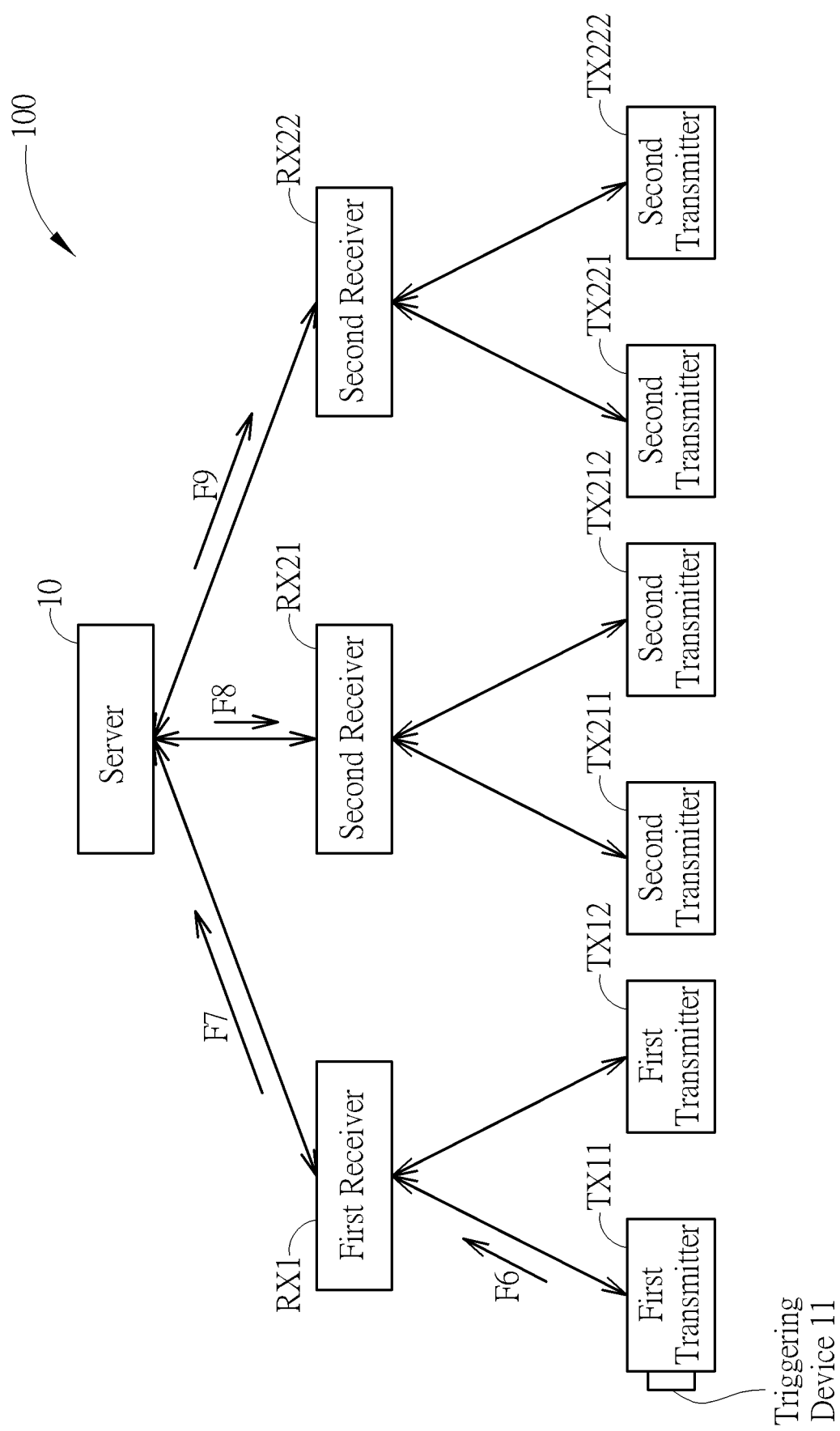
FIG. 4 is an illustration of data paths under a third calling mode of the data sharing system in FIG. 1.

FIG. 4 is an illustration of data paths under a third calling mode of the data sharing system 100. In the third calling mode, the first transmitter TX11 is coupled to the triggering device 11. The triggering device 11 can be an input device, such as a mouse, a keyboard, or a touch panel. After the triggering device 11 is coupled to the first transmitter TX11, the user can input an activation message through the triggering device 11 for generating an input device signal. Then, the input device signal can be transmitted to the first receiver RX1 through the data path F6. The input device signal can also be automatically generated after the triggering device 11 is coupled to the first transmitter TX11. Then, the first receiver RX1 can use an application program for generating the selection interface. The user can select the first receiver RX1 for linking with at least one second receiver through the triggering device 11 and the first transmitter TX11 (i.e., for example, selecting the second receiver RX21 and the second receiver RX22 at the same time). Then, the first receiver RX1 can be triggered for generating a request signal. The request signal can be transmitted to the server 10 through the data path F7. The server 10 can relay the request signal to the second receiver RX21 and the second receiver RX22 through the data paths F8 and F9 respectively. In practice, for example, the user in the conference room A can use a keyboard or a mouse device (i.e., the triggering device 11 can also be regarded as an input device) for generating the input device signal to the first receiver RX1. The user can further use the selection interface of the application program executed by the first receiver RX1 for selecting the first receiver RX1 and the second receiver RX21 (i.e., disposed inside the conference room B) and the second receiver RX22 (i.e., disposed inside the conference room C)). Here, the calling group includes the first receiver RX1, the second receiver RX21, and the second receiver RX22. Finally, the first receiver RX1, the second receiver RX21, and the second receiver RX22 can establish links through the server 10. In the data sharing system 100, as previously mentioned, the server 10 may be the Google server or other server for online video sharing. The first receiver RX1 has a preconfigured Google account (i.e., T11@google.com). The second receiver RX21 has a preconfigured Google account (i.e., T21@google.com). Therefore, when an online meeting is ready, the user can enter the name and account number corresponding to the second receiver RX21 and/or RX22.

Figure 5:
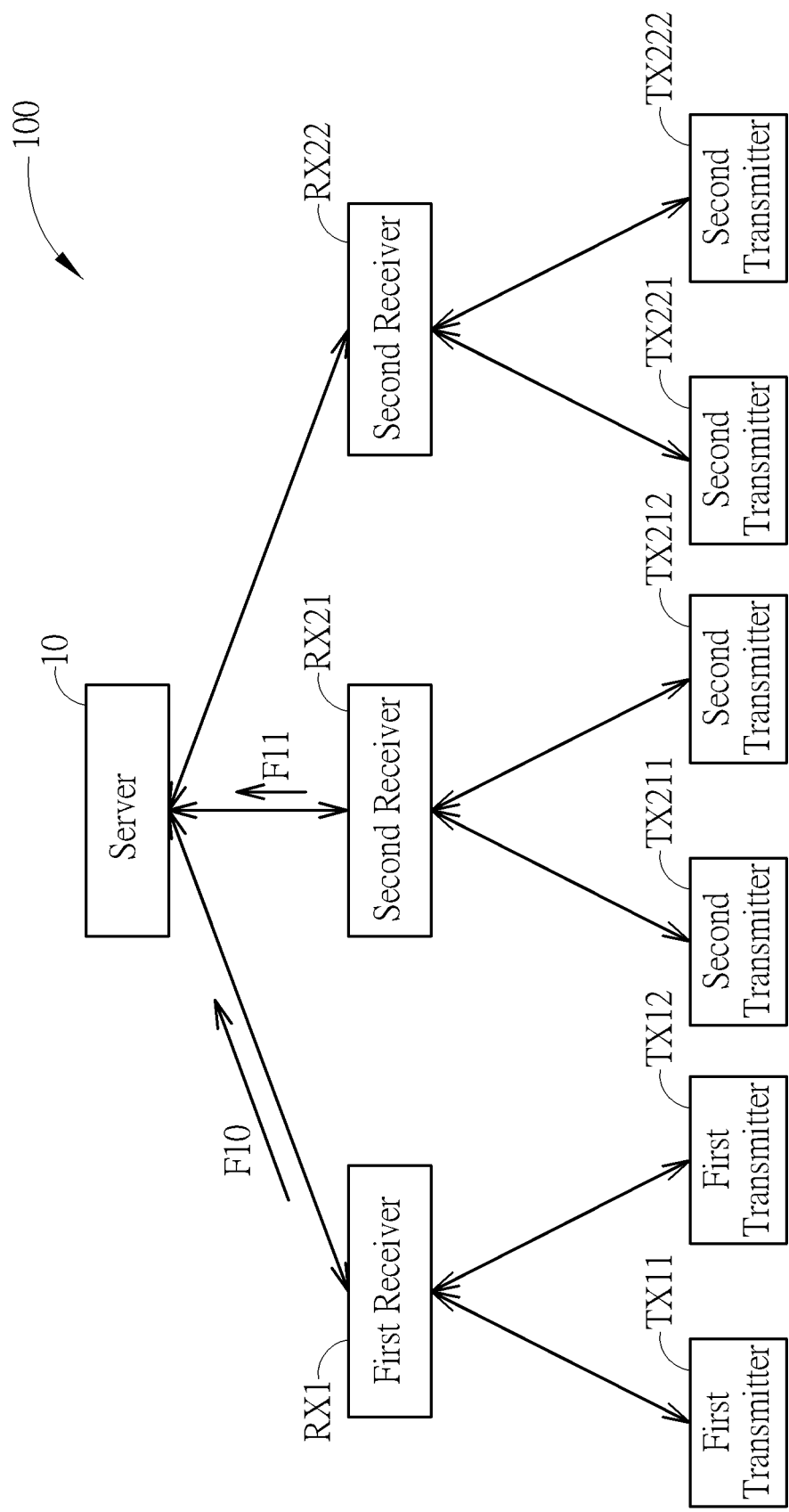
FIG. 5 is an illustration of data paths under a fourth calling mode of the data sharing system in FIG. 1.

FIG. 5 is an illustration of data paths under a fourth calling mode of the data sharing system 100. In the fourth calling mode, the first receiver RX1 and/or at least one second receiver (RX21 and/or RX22) use a scheduling procedure for generating a request signal at a predetermined time point. For example, receivers in FIG. 5 (including the first receiver RX1, the second receiver RX21, and the third receiver RX22) are capable of linking with an email server and a web calendar server. Therefore, the user can enable the first receiver RX1 and/or at least one second receiver (RX21 and/or RX22) for a conference meeting at a specific time point by using the email server or the web calendar server. In other words, the calling group can be regarded as a predetermined scheduling group including the first receiver RX1 and/or at least one second receiver (RX21 and/or RX22). Here, the first receiver RX1 and/or the at least one second receiver (RX21 and/or RX22) can generate a request signal at the predetermined time point. Then, a link between the first receiver RX1 and the at least one second receiver (RX21 and/or RX22) during a time interval according to the request signal is established when the at least one second receiver (RX21 and/or RX22) or the second transmitter is triggered during the time interval. For example, the user can use functions of the email server or the network calendar server for setting a time interval as 14:00 to 15:00. Therefore, the first receiver RX1 and the second receiver RX21 are enabled for the conference meeting during the time interval. Here, the calling group includes the first receiver RX1 and the second receiver RX21. Particularly, at time point 14:00, the first receiver RX1, the second receiver RX21, and the corresponding transmitters (i.e., such as the first transmitter TX11, the first transmitter TX12, the second transmitter TX211, and the second transmitter TX212) can generate notification messages, such as emitting light signals. The user in conference room A and the user in conference room B can use a confirmation key for confirming that the conference has started according to the scheduling procedure. Then, the first receiver RX1 can transmit a feedback message to the server 10 through the data path F10. Similarly, the second receiver RX21 can transmit a feedback message to the server 10 through the data path F11. Finally, a link between the first receiver RX1 and the second receiver RX21 can be established through the server 10.

The data sharing system 100 is not limited to the aforementioned embodiments. For example, the data sharing system 100 also supports a cross-company conference calling mode. For example, the server 10 can acquire first network domain information of the first receiver RX1 in the conference room A. The server 10 can acquire second network domain information of the second receiver RX22 in the conference room C. Then, the server 10 can integrate the first network domain information with the second network domain information for establishing a cross-network domain calling group. After the first network domain information and the second network domain information are integrated, a data link between the first receiver RX1 and the second receiver RX22 is established according to the cross-network domain calling group. Further, in the data sharing system 100, each of the receivers corresponds to an identification code. For example, an identification code of the first receiver RX1 can be ID: RX1A. An identification code of the second receiver RX21 can be ID: RX2B. An identification code of the second receiver RX22 can be ID: RX3C. Each receiver can perform a registration process to the server 10 by using the identification code. After each receiver completes the registration process, the server 10 can save the identification code of the each receiver for identifying the receivers. Further, the data sharing system 100 can limitedly share data. For example, after the first receiver RX1 establishes a data link with at least one second receiver (RX21 and/or RX22), the image data can be limitedly shared with the first receiver RX1 and the at least one second receiver (RX21 and/or RX22) according to a first authorization configuration of the first receiver RX1 and a second authorization configuration of the second receiver RX21 or RX22. Here, the first authorization configuration and the second authorization configuration can include a browsing authorization configuration, a data sharing authorization configuration, a data accessing authorization configuration, and/or a data content blocking rights authorization configuration. For example, a user can set the sharing authority of the image data on a certain receiver or a transmitter. Therefore, in the calling group, the image data shared by some receivers can be restricted for protecting privacy or providing high data security. Any technology modification of the data sharing system 100 falls into the scope of the present invention.

Further, in the data sharing system 100, the server 10 can use tag signals for identifying different conference rooms. The tag signals can be generated by the receivers or the server 10. For example, after the first receiver RX1 and at least one second receiver (RX21 and/or RX22) in the calling group accept the link request for sharing the image data, the server 10 can generate the tag signal. For example, the conference room A where the first receiver RX1 is disposed corresponds to a tag signal SA. The conference room B where the second receiver RX21 is disposed corresponds to a tag signal SB. The conference room C where the second receiver RX22 is disposed corresponds to a tag signal SC. The server 10 can generate and save the tag signals for identifying different receivers. In practice, the server 10 can generate an identifier table corresponding to different receivers. After a receiver is triggered, the server 10 can immediately identify the triggered receiver. By doing so, the server 10 can establish a data link between the first receiver RX1 and the at least one second receiver (RX21 and/or RX22) according to the tag signal for sharing the image data. Further, when the image data is shared with the first receiver RX1 and the at least one second receiver (RX21 and/or RX22), a sharing interface is generated. The sharing interface can include an option for switching on the first receiver RX1 or the second receiver RX21 or RX22 for transmitting the image data. The sharing interface can include an option for partitioning displayed image contents shared by the first receiver RX1 and the at least one second receiver (RX21 and/or RX22) into a plurality of split images of a screen. In the data sharing system 100, configurations of the split images of the sharing interface and configurations of the switching options can be reasonably modified.

Figure 6:
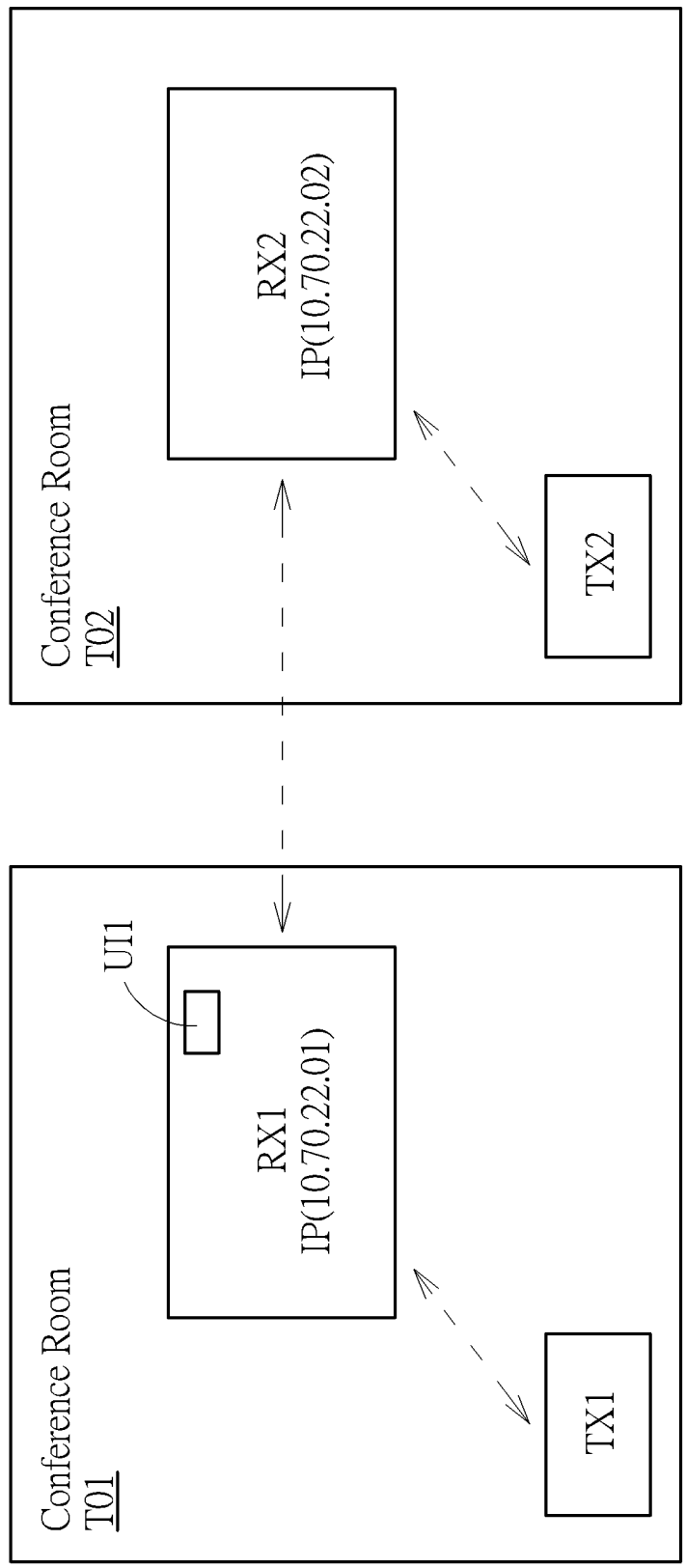
FIG. 6 is an illustration of performing direct connections between the first receiver and the second receiver by using internet protocol addresses of the data sharing system in FIG. 1.

FIG. 6 is an illustration of performing direct connections between the first receiver RX1 and the second receiver RX2 by using internet protocol addresses of the data sharing system 100. The first receiver RX1 and the second receiver RX2 can be directly linked by internet protocol addresses. The first receiver RX1 can read a first internet protocol address previously saved, such as IP (10.70.22.01). The second receiver RX2 can read a second internet protocol address previously saved, such as IP (10.70.22.02). Then, a link between the first receiver RX1 and the second receiver RX2 according to the first internet protocol address and the second internet protocol address can be established. The link can be generated by using an active link establishment method or a passive link establishment method. For example, the first receiver RX1 can transmit a request message to the second receiver RX2 for requesting the second receiver RX2 to establish a link with the first receiver RX1. Alternatively, the first receiver RX1 can actively link to the second receiver RX2. After the link between the first receiver RX1 and the second receiver RX2 is established, the first receiver RX1 can communicate with the receiver RX2. For example, the second transmitter TX2 linked to the second receiver RX2 can transmit second image data to the second receiver RX2. After the link between the first receiver RX1 and the second receiver RX2 is established, the first receiver RX1 can receive the second image data transmitted from the second receiver RX2 through the link. Then, the first transmitter TX1 linked to the first receiver RX1 can transmit the first image data to the first receiver RX1. In other words, the first receiver RX1 can acquire the first image data and the second image data. Finally, the first receiver RX1 can integrate the first image data with the second image data for displaying on the first display D1. Further, the first receiver RX1 can also use an interface UI1 for setting the second internet protocol address corresponding to the second conference room T02. The first receiver RX1 can also use the interface UI1 for setting the third internet protocol address corresponding to the third conference room T03 (not shown). Therefore, the first receiver RX1 can establish network links to the second conference room T02 and/or the third conference room T03 according to the second internet protocol address and the third internet protocol address.

Figure 7:
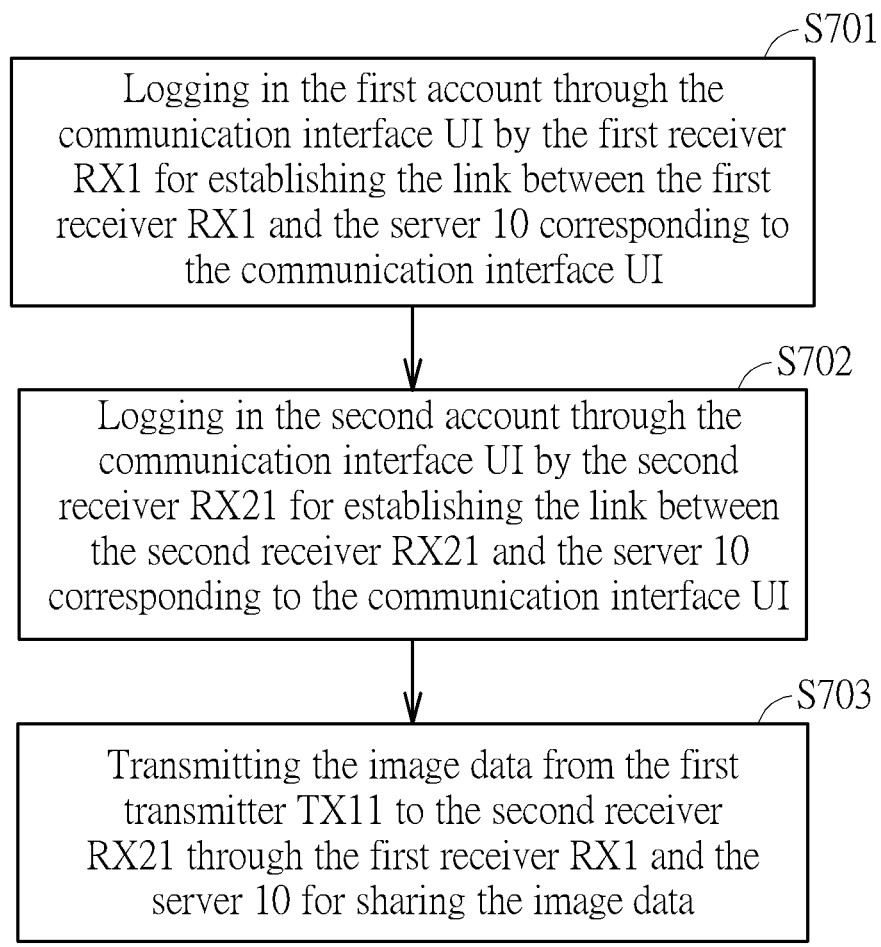
FIG. 7 is a flow chart of a data sharing method performed by the data sharing system in FIG. 1.

FIG. 7 is a flow chart of a data sharing method performed by the data sharing system 100. The data sharing method includes step S701 to step S703. Any technology modification falls into the scope of the present invention. Step S701 to step S703 are illustrated below.

step S701: logging in the first account through the communication interface UI by the first receiver RX1 for establishing the link between the first receiver RX1 and the server 10 corresponding to the communication interface UI;

step S702: logging in the second account through the communication interface UI by the second receiver RX21 for establishing the link between the second receiver RX21 and the server 10 corresponding to the communication interface UI;

step S703: transmitting the image data from the first transmitter TX11 to the second receiver RX21 through the first receiver RX1 and the server 10 for sharing the image data.

Details of step S701 to step S703 are previously illustrated. Thus, they are omitted here. The data sharing system 100 can execute various data sharing modes according to step S701 to step S703 for the user. Further, since the user can intuitively operate the data sharing system 100 for executing various data sharing modes, the operation efficiency can be increased.

To sum up, the present invention discloses a data sharing method and a data sharing system. The data sharing system uses a calling group for establishing a data sharing network of at least two different receivers. The calling group can be generated according to manual configurations or scheduled configurations. Further, since the receiver can be linked to a plurality of transmitters, a user only needs to control the receiver or at least one transmitter for communicating with another transmitter or another receiver disposed inside a remote conference room. Then, the user can immediately execute a data sharing function. Further, since the user can intuitively operate the data sharing system for executing various data sharing modes, the operation efficiency can be increased.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A data sharing method comprising:
   logging in a first account through a communication interface by a first receiver for establishing a link between the first receiver and a server corresponding to the communication interface;
   logging in a second account through the communication interface by a second receiver for establishing a link between the second receiver and the server corresponding to the communication interface;
   acquiring first network domain information of the first receiver;
   acquiring second network domain information of the second receiver;
   integrating the first network domain information with the second network domain information for establishing a cross-network domain calling group;
   establishing a data link between the first receiver and the second receiver through the server according to the cross-network domain calling group after the first network domain information and the second network domain information are integrated; and
   transmitting image data from a first transmitter to the second receiver through the first receiver and the server for sharing the image data;
   wherein the first receiver is linked to a first display, the second receiver is linked to a second display, and the image data is shared with the first display and the second display.

2. The method of claim 1, further comprising:
   establishing a calling group;
   transmitting a request signal from the first receiver to the second receiver through the communication interface and the server when the first receiver or the first transmitter is triggered;
   generating a notification message after the request signal is received by the second receiver; and
   generating a connection acceptance signal by the second receiver or the second transmitter according to the notification message;
   wherein the calling group comprises the first receiver and the second receiver, and the first receiver transmits the request signal to other receivers of the calling group under a global broadcast calling mode through the server, the first transmitter is linked to the first receiver, and the second transmitter is linked to the second receiver.

3. The method of claim 1, further comprising:
   establishing a calling group;
   transmitting a request signal from the first receiver to the second receiver through the communication interface and the server when the first receiver or the first transmitter is triggered;
   generating a notification message after the request signal is received by the second receiver; and
   generating a connection acceptance signal by the second receiver or the second transmitter according to the notification message;
   wherein the calling group comprises the first receiver and the second receiver, the second receiver or the second transmitter of the calling group is triggered according to the notification message for generating the connection acceptance signal, the first transmitter is linked to the first receiver, and the second transmitter is linked to the second receiver.

4. The method of claim 1, further comprising:
   generating a request signal at a time point by using a scheduling process;
   wherein the data link between the first receiver and the second receiver is enabled enabling during a time interval according to the request signal when the second receiver or the second transmitter is triggered during the time interval, the first transmitter is linked to the first receiver, and the second transmitter is linked to the second receiver.

5. The method of claim 1, further comprising:
   linking an input device to the first transmitter; and
   generating an input device signal to the first receiver for triggering the first receiver to generate a request signal to the second receiver after the input device is linked to the first transmitter;
   wherein the input device is used for selecting the second receiver through an operation interface generated by the first receiver for establishing a calling group to share the image data.

6. The method of claim 1, further comprising:
   limitedly sharing the image data according to a first authorization configuration of the first receiver and a second authorization configuration of the second receiver after a data link between the first receiver and the second receiver is established;
   wherein the first authorization configuration and the second authorization configuration comprise a browsing authorization configuration, a data sharing authorization configuration, a data accessing authorization configuration, and/or a data content blocking rights authorization configuration.

7. The method of claim 1, further comprising:
   generating a sharing interface when the image data is shared with the first receiver and the second receiver;
   wherein the sharing interface comprises an option for switching on the first receiver or the second receiver for transmitting the image data, or an option for partitioning displayed image contents shared by the first receiver and the second receiver into a plurality of split images of a screen.

8. The method of claim 1, further comprising:
the first receiver using at least one port for linking to a peripheral video capturing device; and
the peripheral video capturing device capturing video information in a first conference room where the first receiver is disposed;
wherein after the data link between the first receiver and the second receiver is established, the second receiver transmits data transmitted from the first receiver and the video information in the first conference room captured by the peripheral video capturing device to a designated receiver through the server.

9. The method of claim 1, further comprising:
receiving image data transmitted from at least one receiver by the server; and
integrating the image data transmitted from the at least one receiver by the server to the first display, or receiving image data transmitted from the second receiver through the server by the first receiver for integrating the image data transmitted from the first transmitter with the image data transmitted from the second receiver to the first display.

10. A data sharing method comprising:
reading a first internet protocol address saved in a first receiver;
acquiring first network domain information of the first receiver;
reading a second internet protocol address saved in a second receiver;
acquiring second network domain information of the second receiver;
integrating the first network domain information with the second network domain information for establishing a cross-network domain calling group;
establishing a data link between the first receiver of the first internet protocol address and the second receiver of the second internet protocol address according to the cross-network domain calling group after the first network domain information and the second network domain information are integrated; and
communicating the first receiver with the second receiver after the data link between the first receiver and the second receiver is established.

11. The method of claim 10, further comprising:
transmitting second image data from a second transmitter linked to the second receiver to the second receiver;
receiving the second image data transmitted from the second receiver by the first receiver through the data link after the data link between the first receiver and the second receiver is established;
transmitting first image data from a first transmitter linked to the first receiver to the first receiver; and
integrating the first image data with the second image data by the first receiver for displaying an integrated image on a first display.

12. The method of claim 10, further comprising:
using an interface of the first receiver for setting the second internet protocol address and a third internet protocol address;
wherein the second internet protocol address corresponds to a second conference room, and the third internet protocol address corresponds to a third conference room.

13. A data sharing system comprising:
a plurality of receivers comprising a first receiver and a second receiver;
a first transmitter linked to the first receiver;
a second transmitter linked to the second receiver; and
a server linked to the plurality of receivers;
wherein the first receiver uses a communication interface for logging in a first account, the first receiver is linked to the server through the communication interface after the first account is logged in, the second receiver uses the communication interface for logging in a second account, the second receiver is linked to the server through the communication interface after the second account is logged in, the first transmitter transmits image data to the second receiver through the first receiver and the server for sharing the image data, the first receiver is linked to a first display, the second receiver is linked to a second display, and the image data is shared with the first display and the second display; and
wherein the server acquires first network domain information of the first receiver, the server acquires second network domain information of the second receiver, the server integrates the first network domain information with the second network domain information for establishing a cross-network domain calling group, and a data link between the first receiver and the second receiver is established according to the cross-network domain calling group after the first network domain information and the second network domain information are integrated.

14. The system of claim 13, wherein the first receiver transmits a request signal to the second receiver through the communication interface and the server when the first receiver or the first transmitter is triggered, the second receiver generates a notification message after the request signal is received by the second receiver, the second receiver or the second transmitter generates a connection acceptance signal according to the notification message, a calling group comprising the first receiver and the second receiver is established, and the first receiver transmits the request signal to other receivers of the calling group under a global broadcast calling mode through the server.

15. The system of claim 13, wherein the second receiver is selected by using a selection interface, the first receiver transmits a request signal to the second receiver through the communication interface and the server when the first receiver or the first transmitter is triggered, the second receiver generates a notification message after the request signal is received by the second receiver, the second receiver or the second transmitter generates a connection acceptance signal according to the notification message, a calling group comprising the first receiver and the second receiver is established, and the second receiver or the second transmitter of the calling group is triggered according to the notification message for generating the connection acceptance signal.

16. The system of claim 13, wherein the first receiver and/or the second receiver generates a request signal at a time point by using a scheduling process, and the data link between the first receiver and the second receiver during a time interval is enabled according to the request signal when the second receiver or the second transmitter is triggered during the time interval.

17. The system of claim 13, wherein an input device is linked to the first transmitter, an input device signal is generated to the first receiver for triggering the first receiver to generate a request signal to the second receiver after the input device is linked to the first transmitter, the input device is used for selecting the second receiver through an operation interface generated by the first receiver for establishing a calling group to share the image data.

18. The system of claim 13, wherein after the data link between the first receiver and the second receiver is established, the image data is limitedly shared with the first receiver and the second receiver according to a first authorization configuration of the first receiver and a second authorization configuration of the second receiver, the first authorization configuration and the second authorization configuration comprise a browsing authorization configuration, a data sharing authorization configuration, a data accessing authorization configuration, and/or a data content blocking rights authorization configuration.

19. The system of claim 13, wherein a sharing interface is generated when the image data is shared with the first receiver and the second receiver, and the sharing interface comprises an option for switching on the first receiver or the second receiver for transmitting the image data, or an option for partitioning displayed image contents shared by the first receiver and the second receiver into a plurality of split images of a screen.

20. The system of claim 13, wherein the first receiver uses at least one port for linking to a peripheral video capturing device, the peripheral video capturing device captures video information in a first conference room where the first receiver is disposed, after the data link between the first receiver and the second receiver is established, the second receiver transmits data transmitted from the first receiver and the video information in the first conference room captured by the peripheral video capturing device to a designated receiver through the server.

21. The system of claim 13, wherein the server receives image data transmitted from at least one receiver, the server integrates the image data transmitted from the at least one receiver to the first display, or the first receiver receives image data transmitted from the second receiver through the server for integrating the image data transmitted from the first transmitter with the image data transmitted from the second receiver to the first display.

\* \* \* \* \*